United States Patent [19]

Caroe et al.

[11] Patent Number: 5,121,558
[45] Date of Patent: Jun. 16, 1992

[54] METHOD AND APPARATUS FOR CONTROLLING AND INDICATING ANGULAR ROTATION OF A SHAFT

[75] Inventors: Alfred G. Caroe; Mark R. McCormack, both of Palm Bay, Fla.

[73] Assignee: AGC Industries, Inc., Palm Bay, Fla.

[21] Appl. No.: 578,574

[22] Filed: Sep. 7, 1990

[51] Int. Cl.⁵ .......................... G01B 5/14; G01D 5/04
[52] U.S. Cl. .......................................... 33/7; 33/709; 33/1 N
[58] Field of Search .............. 33/700, 709, 1 N, 1 PT, 33/806, 813, 814

[56] References Cited

U.S. PATENT DOCUMENTS

| 2,037,858 | 4/1936 | Holls | 33/806 |
| 3,126,639 | 3/1964 | Larson et al. | 33/700 |
| 3,996,669 | 12/1976 | Anichini | 33/709 |
| 4,252,360 | 2/1981 | Gallaher, Jr. | |
| 4,416,063 | 11/1983 | Nestor et al. | 33/709 |
| 4,513,512 | 4/1985 | Fischer | 33/471 |
| 4,989,329 | 2/1991 | Pullen | 33/1 N |

FOREIGN PATENT DOCUMENTS

| 55-156803 | 12/1980 | Japan | 33/1 PT |
| 57-116213 | 7/1982 | Japan | 33/1 N |
| 57-197422 | 12/1982 | Japan | |
| 61-76901 | 4/1986 | Japan | 33/1 N |
| 145117 | 1/1962 | U.S.S.R. | 33/700 |
| 932228 | 5/1982 | U.S.S.R. | 33/1 N |
| 908856 | 10/1962 | United Kingdom | |

Primary Examiner—William A. Cuchlinski, Jr.
Assistant Examiner—C. W. Fulton
Attorney, Agent, or Firm—Wegner, Cantor, Mueller & Player

[57] ABSTRACT

A shaft is supported rotatably within a tubular aluminum extrusion and is rotated by a motor, with at least a portion of the length of the shaft comprising a lead screw along which a nut is displaced during rotation of the shaft, with a member projecting from the nut radially of the shaft and through a slot in the extrusion. The projecting member provides a linearly movable indicator for measurement and/or control of the direction and amount of rotation of the shaft. For measurement purposes, a simple scale or more elaborate linear encoder may be situated at the slot for cooperation with the moveable member. For control purposes, proximity switches are adjustably repositionable along the slot so as to establish limits by and in response to which a controller may control the rotation.

3 Claims, 3 Drawing Sheets

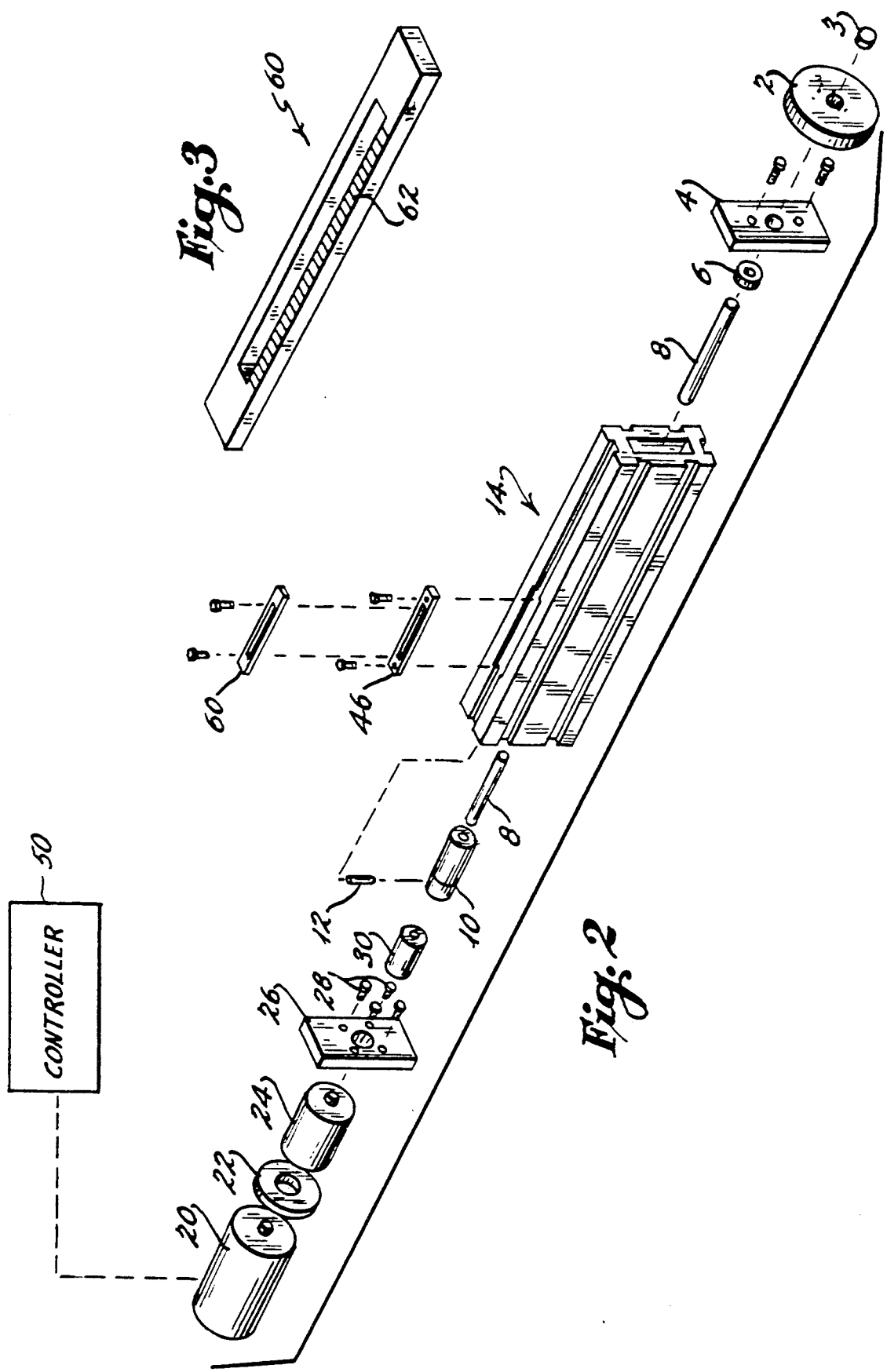

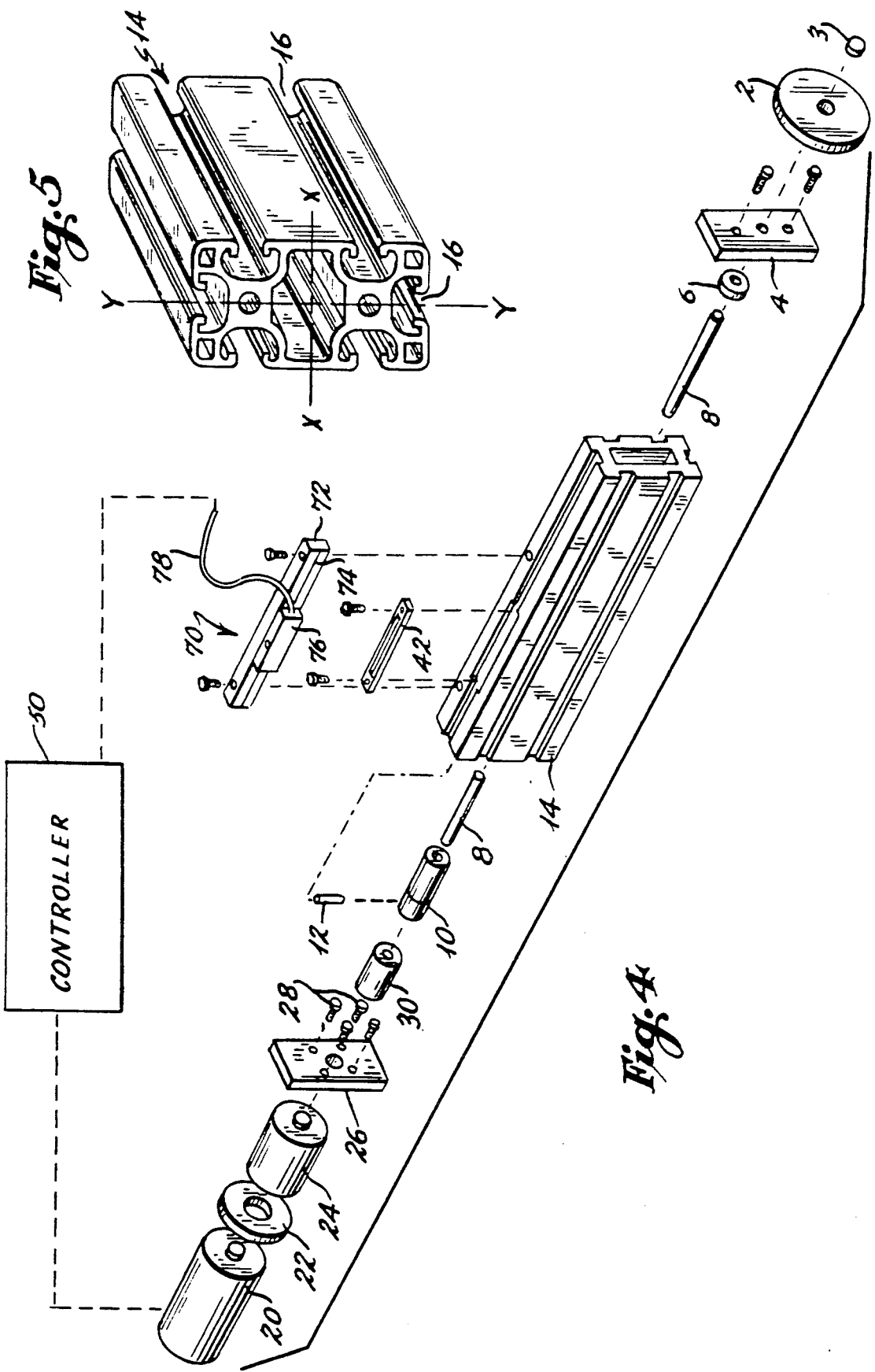

METHOD AND APPARATUS FOR CONTROLLING AND INDICATING ANGULAR ROTATION OF A SHAFT

PRIOR ART CROSS REFERENCES

U.S Pat. No. 4,513,512—ANGLE-MEASURING INSTRUMENT HAVING AN INDICATOR FOR THE DEGREE OF ANGLE—issued Apr. 30, 1985.

U.S. Pat. No. 4,252,360—MECHANICAL HANDLING APPARATUS issued Feb. 24, 1981.

Japanese Patent No. 61-76901—ROTATIONAL ANGLE DETECTOR issued Apr. 19, 1986.

Japanese Patent No. 57-197422—DETECTOR FOR ROTATING ANGLE issued Dec. 3, 1982.

Japanese Patent No. 57-116213—ANGLE MEASURING DEVICE issued Jul. 20, 1982.

U.S.S.R. Patent No. 932,228—MEASURING MULTIPLE TURN ANGLES AGAINST HORIZON - BY USING HELICAL RESISTANCE DRUM WITHIN FLOAT IN LIQUID FOR ABSOLUTE ELECTRICAL SIGNAL PROPORTIONAL TO ANGLE—issued May 30, 1982.

Japanese Patent No. 55-156803—DETECTOR OF STEERING ANGLE issued Dec. 6, 1980.

British Patent 908,856—Oct. 24, 1962—IMPROVEMENTS IN AND RELATING TO SUSPENDED FORGE MANIPULATORS—issued Oct. 24, 1962.

BACKGROUND AND SUMMARY OF THE INVENTION

The invention relates generally to measuring and controlling angles of rotation of a shaft and more particularly deals with detecting and/or controlling angular rotation of the shaft via detecting and/or measuring a commensurate linear displacement of a member along the shaft in response to the angular rotation.

The invention concerns improvements in controlling a rotational axis and particularly provides a means by which angular rotation of a device which is attached to the shaft may be monitored, measured, and/or controlled with a simplicity, reliability and efficiency of structure not found in the prior art.

A particularly unique feature of one embodiment of the invention provides for positional adjustment of each proximity switch, manually, by simply loosening a thumbknob, sliding the switch in a direction parallel to the rotational shaft, and retightening the thumbknob to lock that limit sensor in the readjusted position.

Another unique feature of the invention is the nonoverlapping linear output indication of angular rotations which may exceed three hundred sixty degrees in either or both of the clockwise and counterclockwise directions.

In another embodiment of the invention, a pointer is movable back and forth along the axis of rotation and relative to a linearly disposed scale which is observable by an operator of the device and which is calibrated to indicate and provide measurement of the degrees of angular rotation of the shaft.

In still another embodiment of the invention, the scale is replaced by the glass rod of a so-called linear glass encoder with the optical reader of the encoder being connected to the existing pointer for movement therewith.

In each of the embodiments, and variations thereof, it is preferred that the linearly movable member is engaged with and movable along the rotational shaft so as to provide a compact device which is relatively simple in construction and substantially protected from damage and which may be easily and manually readjusted.

Accordingly, it is an object of the invention to provide a relatively inexpensive, yet highly accurate monitor of the direction and amount of angular rotation of a rotational shaft for the purpose of measuring and/or controlling the rotation thereof.

Other objects and advantages of the invention will become more apparent from the following description in conjunction with the accompanying drawings.

BRIEF SUMMARY OF THE INVENTION

A shaft is supported rotatably within a tubular aluminum extrusion and is rotated by a motor, with at least a portion of the length of the shaft comprising a lead screw along which a nut is displaced during rotation of the shaft, and a pin projects from the nut radially of the shaft and through a slot in the extrusion. The projecting member provides a linearly movable indicator for measurement and/or control of the direction and amount of rotation of the shaft. For measurement purposes, a simple scale or more elaborate linear encoder may be situated at the slot for cooperation with the moveable member. For control purposes, proximity switches are adjustably repositionable along the slot so as to establish limits by and in response to which a controller may control the rotation.

BRIEF DESCRIPTION OF THE DRAWINGS

FIGS. 1, 2, and 4 are exploded, isometric views of the apparatus of the invention.

FIG. 3 is an enlarged isometric view of an indicator scale for the apparatus of FIG. 2.

FIG. 5 is an isometric view of a section of an alternative embodiment of the housing of the invention.

DETAILED DESCRIPTION OF THE INVENTION

Figure 1:
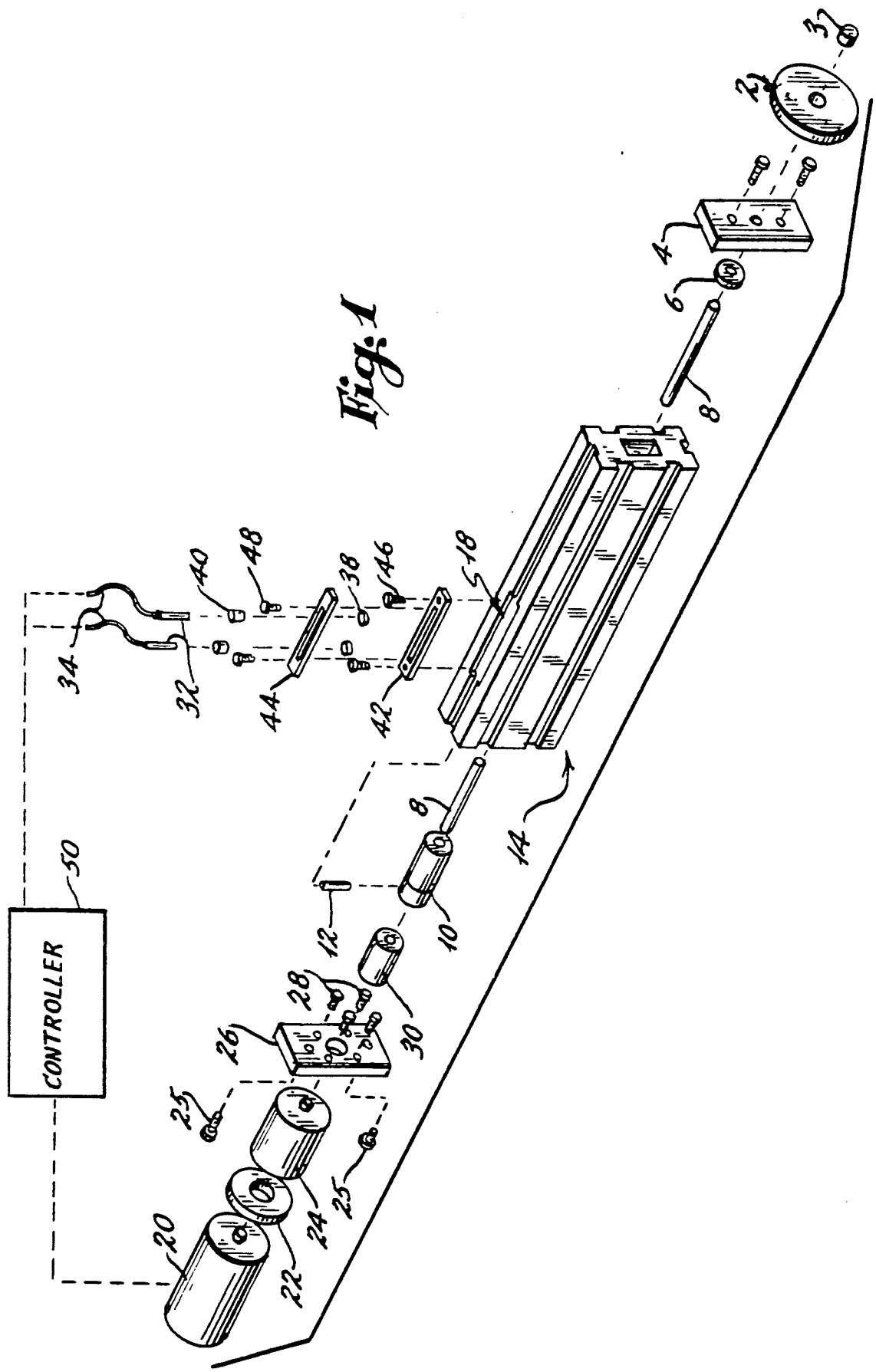

Throughout the drawings, like numbers refer to like components.

Referring to the drawings, disc 2 provides a mounting plate for supporting a tool or the like and is secured to the end of a shaft 8 for rotation therewith. A bottom plate 4 is secured by machine screws to one end of a tubular housing 14 and has a bearing 6 mounted in the back surface thereof, as viewed in the drawings, so as to rotationally support one end of shaft 8 that protrudes through plate 4 while supporting disc 2. Shaft 8 extends through housing 14 and at least a portion of the shaft is threaded to provide a lead screw for receiving a cooperating nut 10.

A reversible motor 20 is drivingly attached to a zero-backlash speed reducer 24, with a spacer positioned between them. Reducer 24 is supported on top plate 26 by machine screws 28 and top plate 26, in turn, is attached to and supported on housing 14 by machine screws 25. The output shaft of the reducer 24 extends through plate 26 and is received in one end of a tubular slip coupling 30. The shaft 8 is received in the other end of coupling 30, and set screws retain the two shafts in the coupling.

An opening 18 is provided through the side of housing 14 and is situated so that pin 12 will protrude therethrough from the nut 10. A slotted plate 42 is positioned over the opening 18 by machine screws and receives the free end of pin 12 within the slot thereof. Thus nut 10 is restrained from rotating and pin 12 moves back and forth in the slot of plate 42 during rotation of shaft 8 and according to the amount and direction of angular rotation thereof.

In the embodiment of FIG. 1, a second slotted plate 44 is attached to the first plate 42 by machine screws and the underside of the slot of plate 44 is widened in order to receive nuts 38 therein such that they are repositionable along the length of the slot. Proximity switches 32 are threaded on the exterior thereof so as to threadedly engage and pass through thumbknobs 40, slidably pass through the slot of plate 44, and thread into nuts 38.

Thus, a thumbknob 40 may be loosened by hand so that the proximity switch may be repositioned by sliding it along the slot to a desired position and then hand-tightening the thumbknob. Nuts may be locknuts or have lock washers associated therewith where necessary. Indicia may be provided on the surface of plate 44, as desired, to aid in the repositioning of the proximity switches 32.

In use, the nut 10 slides back and forth along the lead screw portion of rotary shaft 8 during and according to rotation thereof, and one end of pin 12 rides back and forth in the slot of plate 42 for detection by proximity switches 32. Proximity switches 32 serve as limit switches in this embodiment by detecting alignment of pin 12 with either of the switches and signaling the event to a controller 50 via electrical wires 34. The controller 50, in turn, halts or reverses rotation of shaft 8, as needed, by controlling the motor 20.

Thus angular rotation of disc 2 in either or both of the clockwise and counterclockwise directions is converted to linear movement of pin 12 along the length of the rotating shaft 8, and the extent of the rotation is controlled by detecting the position of pin 12 and reversing or stopping the motor 20 in response to such detecting.

Referring to FIG. 2, the proximity switches 32 and plate 44 of FIG. 1 have been replaced by the plate 60 (enlarged in FIG. 3) having indicia 62 along the length thereof such as a scale of the degrees of rotation of shaft 8. In this embodiment, the controller 50 provides programmed control of motor 20 without being part of a control feedback path.

In the embodiment of FIG. 4, a so-called glass linear encoder 70 has replaced the proximity switches 32 and plate 44 of FIG. 1. Encoder 70 comprises a housing 72 within which is situated a glass bar or rod (not seen) having fiducials thereon. A slit 74 along the length of housing 72 has a dust seal through which a optical reader 76 extends to "read" the position of member 76 as it is moved along the length of the glass. A similar glass linear encoder is distributed by the Heidenhain Corp., Schaumberg, Illinois under the Model No. LS704. Reader 76 may be provided with an orifice into which the tip of pin 12 registers so as to drive reader back and forth. The output of reader 76 is fed via electrical cable to controller 50 for control of motor 20.

Thus, the embodiment of FIG. 4 allows constant monitoring of the position of pin 12 throughout its path of travel along the slot of plate 42, as opposed to detecting when it has reached certain "limits". This allows full range, incremental control of the rotation of shaft 8 and the tool which is mounted on disc 2 by providing the controller 50 with the position of pin 12 at all times.

In a prototype of the apparatus of the invention, the proximity switches used were manufactured by the Keyance Corp., of New Jersey, under the Model No. EZ8M.

The following claims are intended to cover all of the generic and specific features of the invention herein described and all statements of the scope of the invention which as a matter of language, might be said to fall therebetween.

Now that the invention has been described, WE CLAIM:

1. In an apparatus for controlling angular rotation of a shaft, said apparatus comprising means for driving said shaft rotationally, means for displacing a member parallel to an axis of said shaft according to a direction and an amount of said angular rotation, means for providing linear limits of said displacing such that each of said linear limits is commensurate with a particular direction and amount of rotation of said shaft, means for sensing attainment of said limits, and means for controlling said driving in response to said sensing, the improvement comprising:

means for sensing particular positions of displacing of said member, said sensing means being adjustably resituatable back and forth parallel to said shaft axis in order to adjustably reset said linear limits and adjust control of said angular rotation of said shaft;

a housing for said shaft;

at least a portion of said shaft being threaded to provide a lead screw as said displacing means;

a nut threaded onto said lead screw and comprising a pin projecting radially outwardly therefrom so as to provide said member which is displaceable, with at least a tip of said pin protruding through an opening of said housing;

said sensing means comprising limit switches situated at said opening in order to detect the presence of said pin at particular positions along said lead screw; and means for manually and adjustably resituating said limit switches back and forth parallel to said shaft axis.

2. The improvement as in claim 1, wherein said scale comprises:

a linear encoder.

3. The improvement as in claim 1, wherein the means for manually and adjustably resituating said limits switches comprises a thumbknob.

* * * * *